United States Patent
Cavanaugh

(10) Patent No.: US 8,329,836 B2
(45) Date of Patent: Dec. 11, 2012

(54) VISCOSITY CONTROL FOR REDUCED FLUOROSURFACTANT AQUEOUS FLUOROPOLYMER DISPERSIONS BY THE ADDITION OF CATIONIC SURFACTANTS

(75) Inventor: Robert John Cavanaugh, Cincinnati, OH (US)

(73) Assignee: E I du Pont de Nemours and Company, Wilmington, DE (US)

( * ) Notice: Subject to any disclaimer, the term of this patent is extended or adjusted under 35 U.S.C. 154(b) by 711 days.

(21) Appl. No.: 12/501,610

(22) Filed: Jul. 13, 2009

(65) Prior Publication Data

US 2009/0275693 A1  Nov. 5, 2009

Related U.S. Application Data

(62) Division of application No. 11/293,778, filed on Dec. 2, 2005, now abandoned.

(60) Provisional application No. 60/638,310, filed on Dec. 22, 2004.

(51) Int. Cl.
*C08F 2/10* (2006.01)
(52) U.S. Cl. ......... 526/200; 526/242; 526/245; 526/248
(58) Field of Classification Search .................. 526/200, 526/242, 248, 245
See application file for complete search history.

(56) References Cited

U.S. PATENT DOCUMENTS

| 2,478,229 A | 8/1949 | Berry |
| 2,559,752 A | 7/1951 | Berry |
| 3,037,953 A | 6/1962 | Marks et al. |
| 3,704,272 A | 11/1972 | Holmes |
| 3,882,153 A | 5/1975 | Seki et al. |
| 4,282,162 A | 8/1981 | Kuhls |
| 4,369,266 A | 1/1983 | Kuhls et al. |
| 5,969,063 A * | 10/1999 | Parker et al. .................. 526/200 |
| 6,153,688 A | 11/2000 | Miura et al. |
| 6,218,464 B1 * | 4/2001 | Parker et al. .................. 524/805 |
| 6,518,442 B1 | 2/2003 | Felix et al. |
| 6,706,193 B1 * | 3/2004 | Burkard et al. ............... 210/662 |
| 6,825,250 B2 | 11/2004 | Epsch et al. |
| 6,833,403 B1 * | 12/2004 | Bladel et al. .................. 524/458 |
| 6,861,466 B2 | 3/2005 | Dadalas et al. |
| 7,101,925 B2 * | 9/2006 | Malvasi et al. ............... 524/379 |
| 2003/0171736 A1 | 9/2003 | Bon |
| 2003/0220442 A1 | 11/2003 | Epsch et al. |
| 2004/0143052 A1 | 7/2004 | Epsch et al. |
| 2004/0171736 A1 | 9/2004 | Dadalas et al. |
| 2004/0186219 A1 | 9/2004 | Dadalas et al. |

FOREIGN PATENT DOCUMENTS

| EP | 1195420 A1 | 4/2002 |
| EP | 1155055 B1 | 4/2003 |
| WO | WO-2006/069101 A1 * | 6/2006 |

* cited by examiner

*Primary Examiner* — Peter D. Mulcahy
*Assistant Examiner* — Henry Hu

(57) ABSTRACT

A stabilized aqueous fluoropolymer dispersion comprising fluoropolymer particles, wherein the dispersion contains less that about 300 ppm fluorosurfactant based on the weight of the dispersion and a cationic surfactant. The cationic surfactant aids in reducing the viscosity of the dispersion and preferred cationic surfactants are volatile in coating or film casting operations involving drying and sintering of the dispersion.

16 Claims, No Drawings

VISCOSITY CONTROL FOR REDUCED FLUOROSURFACTANT AQUEOUS FLUOROPOLYMER DISPERSIONS BY THE ADDITION OF CATIONIC SURFACTANTS

FIELD OF THE INVENTION

This invention relates to removing fluorosurfactant from aqueous fluoropolymer dispersions and more particularly relates to controlling of the viscosity of the resulting dispersions.

BACKGROUND OF THE INVENTION

Aqueous fluoropolymer dispersions are typically manufactured in an aqueous dispersion polymerization employing anion fluorosurfactants as a polymerization aid, the fluorosurfactants functioning as a non-telogenic dispersing agent. For example, an early description of this use of anionic fluorosurfactants is found in U.S. Pat. No. 2,559,752 (Berry). After polymerization, the dispersions are usually subjected to a concentration step to increase the fluoropolymer solids concentration in the dispersion. In one type of dispersion concentration operation, the dispersion is concentrated with the aid of a nonionic surfactant as taught in Marks et al., U.S. Pat. No. 3,037,953, and in Holmes, U.S. Pat. No. 3,704,272 to raise the solids from nominally 35 wt % in the raw dispersion to about 60 wt % in the concentrated dispersion. Miura et al., U.S. Pat. No. 6,153,688 discloses a similar process. Anionic fluorosurfactants and nonionic surfactants are usually present in the concentrated dispersions.

Because of environmental concerns and because anionic fluorosurfactants are expensive, processes have been developed for the removal of anionic fluorosurfactants from aqueous fluoropolymer dispersions. One method for removal of anionic fluorosurfactants from fluoropolymer dispersions is disclosed in U.S. Pat. No. 4,369,266 and includes the addition of a stabilizing surfactant followed by concentration by ultrafiltration. This patent teaches that a high proportion of the fluorosurfactant can be removed via the aqueous permeate. It is also known to remove anionic fluorosurfactant by adsorption onto an ion exchange resin as taught in U.S. Pat. No. 3,882,153 (Seki et al) and U.S. Pat. No. 4,282,162 (Kuhls). Kuhls teaches recovery of fluorinated emulsifiers dissolved in the aqueous phase after coagulation of the polymer from the dispersion or in aqueous polymer dispersions to be concentrated. In anion exchange processes, the anionic fluorosurfactant is removed by the anion exchange resin from a stabilized dispersion containing nonionic surfactant.

In concentrated aqueous fluoropolymer dispersions which have reduced levels of anionic fluorosurfactant, the viscosity levels can be higher than in dispersions containing fluorosurfactant and can be unacceptably high for some end uses. Certain types of fluoropolymer dispersion, particularly high molecular weight polytetrafluoroethylene dispersions, show an increase to an unusually high viscosity when the anionic fluorosurfactant content is significantly reduced. Viscosity can rise to a level of several hundred centipoise (cP), well above the normal 20-30 cP which is advantageous for coating and impregnating compositions and to make cast films. US 2004/0186219 A1 and US 2003/0171736 A1 (Dadelas et al.) teach the addition of a non-fluorinated anionic surfactant, e.g., sodium lauryl sulfate, sodium dodecylbenzyl sulphonate and secondary alkyl sulphonate sodium salt, to reduce viscosity. However, such non-fluorinated anionic surfactants introduce ionic species into the dispersion which are not volatile under the conditions used for drying and sintering the fluoropolymer in coating or film casting operations. The presence of residues from such species can produce objectionable color in films and coatings and may give rise to long term stability problems.

BRIEF SUMMARY OF THE INVENTION

The present invention provides a stabilized aqueous fluoropolymer dispersion comprising fluoropolymer particles, wherein the dispersion contains less that about 300 ppm fluorosurfactant based on the weight of the dispersion and a cationic surfactant. The cationic surfactant aids in reducing the viscosity of the dispersion and preferred cationic surfactants, unlike the anionic surfactants used by Dadelas et al., are completely volatilized in coating or film casting operations involving drying and sintering of the dispersion.

The invention further provides a process for reducing the viscosity of a stabilized fluorosurfactant-containing aqueous fluoropolymer dispersion by reducing the fluorosurfactant content of the stabilized fluorosurfactant-containing aqueous fluoropolymer dispersion to a predetermined level and adding cationic surfactant. In a preferred embodiment the fluorosurfactant content of a stabilized fluorosurfactant-containing aqueous fluoropolymer dispersion is reduced by contacting the stabilized fluorosurfactant-containing aqueous fluoropolymer dispersion with an anion exchange resin.

DETAILED DESCRIPTION OF THE INVENTION

Fluoropolymer Dispersion

The stabilized fluorosurfactant-containing aqueous fluoropolymer dispersion for treatment in accordance with the present invention is made by dispersion polymerization (also known as emulsion polymerization). The aqueous fluoropolymer dispersion is a stabilized fluorosurfactant-containing aqueous fluoropolymer dispersion which means that it contains sufficient nonionic surfactant to prevent coagulation of the dispersion when the fluorosurfactant content is reduced. As will be explained in more detail hereinafter, depending upon when the process of the invention is employed, the nonionic surfactant may already be present or may be added for stabilization prior to treatment according to the invention. After concentration, aqueous fluoropolymer dispersions are useful in coating or impregnating compositions and to make cast films.

Fluoropolymer dispersions are comprised of particles of polymers made from monomers wherein at least one of the monomers contains fluorine. The fluoropolymer of the particles of the aqueous dispersions used in this invention is independently selected from the group of polymers and copolymers of trifluoroethylene, hexafluoropropylene, monochlorotrifluoroethylene, dichlorodifluoroethylene, tetrafluoroethylene, perfluoroalkyl ethylene monomers, perfluoro(alkyl vinyl ether) monomers, vinylidene fluoride, and vinyl fluoride.

The invention is especially useful when the fluoropolymer component of the dispersion is polytetrafluoroethylene (PTFE) including modified PTFE which is not melt-processible. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 weight %, more preferably less than 0.5 weight %. The modified PTFE contains a small amount of comonomer modifier which improves film forming capability during baking (fusing), such as perfluoroolefin, notably hexafluoropropylene (HFP) or perfluoro (alkyl vinyl)ether (PAVE), where the alkyl group contains 1 to 5 carbon atoms, with perfluoro(ethyl vinyl) ether (PEVE) and perfluoro(propyl vinyl)ether (PPVE) being preferred. Chlorotrifluoroethylene (CTFE), perfluorobutyl ethylene (PFBE), or other monomer that introduces bulky side groups into the molecule are also included. The PTFE typically has a melt creep viscosity of at least $1 \times 10^9$ Pa·s. Such high melt viscosity indicates that the PTFE does not flow in the molten state and therefore is not melt-processible. PTFE and modified PTFE are frequently sold in dispersion form and transported in shipping containers and the process of the invention can be readily employed for reducing the fluorosurfactant content of such dispersions.

The fluoropolymer component of the dispersion may be melt-processible. By melt-processible, it is meant that the polymer can be processed in the molten state (i.e., fabricated from the melt into shaped articles such as films, fibers, and tubes etc. that exhibit sufficient strength and toughness to be useful for their intended purpose). Examples of such melt-processible fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Such fluoropolymers include polychlorotrifluoroethylene, copolymers of tetrafluoroethylene (TFE) or chlorotrifluoroethylene (CTFE). Preferred comonomers with of TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The melt-processible copolymer is made by incorporating an amount of comonomer into the copolymer in order to provide a copolymer which typically has a melt flow rate of about 1-100 g/10 min as measured according to ASTM D-1238 at the temperature which is standard for the specific copolymer. Typically, the melt viscosity will range from $10^2$ Pa·s to about $10^6$ Pa·s, preferably $10^3$ to about $10^5$ Pa·s measured at 372° C. by the method of ASTM D-1238 modified as described in U.S. Pat. No. 4,380,618. Additional melt-processible fluoropolymers are the copolymers of ethylene or propylene with TFE or CTFE, notably ETFE, ECTFE and PCTFE. Further useful polymers are film forming polymers of polyvinylidene fluoride (PVDF) and copolymers of vinylidene fluoride as well as polyvinyl fluoride (PVF) and copolymers of vinyl fluoride.

A typical process for the aqueous dispersion polymerization of preferred polymer PTFE is a process wherein TFE vapor is fed to a heated reactor containing fluorosurfactants, paraffin wax and deionized water. If desired, a chain transfer agent can also be employed to reduce the molecular weight to the desired level. A free-radical initiator solution is added and, as the polymerization proceeds, additional TFE is added to maintain the pressure. The exothermic heat of reaction is removed by circulating cooling water through the reactor jacket. After several hours, the feeds are stopped, the reactor is vented and purged with nitrogen, and the raw dispersion in the vessel is transferred to a cooling vessel. Paraffin wax is removed and polymer dispersion is transferred to a dispersion concentration operation which produces stabilized dispersions which are useful for the practice of the present invention. In the dispersion concentration operation, the dispersion is concentrated with the aid of a nonionic surfactant as taught in Marks et al., U.S. Pat. No. 3,037,953, and in Holmes, U.S. Pat. No. 3,704,272 to raise the solids from nominally 35 wt % to about 60 wt %. Miura et al., U.S. Pat. No. 6,153,688 discloses a similar process. Aromatic alcohol ethoxylates can be used as the nonionic surfactant but, because there is concern about possible environmental harm from aromatic compounds, preferred nonionic surfactants are aliphatic alcohol ethoxylates. Suitable nonionic surfactants include any of a variety of aliphatic alcohol ethoxylates or mixtures thereof which provide the desired cloud point during concentration and which provide desired properties in the dispersion, e.g., low burn off temperature, dispersion stability, etc. Especially preferred nonionic surfactants are a compound or mixture of compounds of the formula:

$$R(OCH_2CH_2)_nOH$$

wherein R is a branched alkyl, branched alkenyl, cycloalkyl, or cycloalkenyl hydrocarbon group having 8-18 carbon atoms and n is an average value of 5 to 18.

Concentrated dispersions containing nonionic surfactant made as described above thus are stabilized fluorosurfactant-containing dispersions suitable for use in the practice of the present invention.

The dispersion polymerization of melt-processible TFE copolymers is similar except that one or more comonomers are added to the batch initially and/or introduced during polymerization. In addition, a telogen such as a hydrocarbon is employed to control the molecular weight to achieve the desired melt flow of the polymer for the intended purpose. The same dispersion concentration operation performed with the aid a nonionic surfactant as used for PTFE dispersions can be used for TFE copolymer dispersions.

Stabilized fluorosurfactant-containing dispersions suitable for use in the practice of the present invention can be made prior to concentration by adding nonionic surfactants to raw dispersion (after wax removal referred to above). It is desirable to use the same nonionic surfactants that will be used for concentration and nonionic surfactants for this purpose are described above. Nonionic surfactant is typically added to the raw dispersion under mild agitation conditions in approximately the same concentrations as is used for concentration, about 2 to about 6% based on the weight of the dispersion.

Stabilized fluorosurfactant-containing fluoropolymer dispersions with solids content of about 15 to about 70 wt % are advantageously treated in accordance with the invention. Preferably, the solids content is at least about 25 wt %, more preferably at least about 30 wt %, and most preferably at least about 35 wt %.

Fluorosurfactants

The anionic fluorosurfactant in the fluorosurfactant-containing dispersions to be reduced in this process is a non-telogenic, anionic dispersing agent, soluble in water and comprising an anionic hydrophilic group and a hydrophobic portion. Preferably, the hydrophobic portion is an aliphatic fluoroalkyl group containing at least four carbon atoms, all except at most one of which, and that one the closest to the solubilizing group, bearing at least two fluorine atoms, the terminal carbon atom bearing in addition an atom consisting of hydrogen or fluorine. These fluorosurfactants are used as a polymerization aid for dispersing and, because they do not chain transfer, they do not cause formation of polymer with undesirable short chain length. An extensive list of suitable fluorosurfactants is disclosed in U.S. Pat. No. 2,559,752 to Berry. Preferably, the fluorosurfactant is a perfluorinated carboxylic acid having 6-10 carbon atoms and is typically used in salt form. Suitable fluorosurfactants are ammonium perfluorocarboxylates, e.g., ammonium perfluorocaprylate or ammonium perfluorooctanoate. The fluorosurfactants are usually present in the amount of 0.02 to 1 wt % with respect to the amount of polymer formed.

Cationic Surfactants

The cationic surfactant used in accordance with the preferred embodiment of the present invention is a quaternary ammonium halide or hydroxide, preferably a compound of the formula:

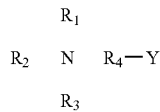

where $R_1$ is a long chain alkyl hydrocarbon, an alkylated aryl hydrocarbon and $R_2$, $R_3$, and $R_4$ are alkyl groups, preferably having 1-16 carbon atoms. The alkyl groups may contain cyclic structures and may be either linear or branched and Y can be F, Cl, Br or OH. Preferably $R_1$ is an alkyl group containing between 8 and 28 carbon atoms, more preferably between 12 and 18 carbon atoms.

In one preferred embodiment, $R_2$, $R_3$, and $R_4$ are the same or different and are selected from the group comprising methyl or ethyl. Two especially effective surfactants are dodecyl trimethyl ammonium bromide and cetyl trimethyl ammonium bromide (CTMAB). CTMAB is also known as hexadecyl trimethyl ammonium bromide.

The cationic surfactants preferably used in accordance with the invention preferably have the advantage of being completely volatile at PTFE sintering temperatures. Therefore, they do not introduce residues into sintered PTFE when the dispersions in accordance with the invention are applied in coating and film applications.

The amount of the cationic surfactant sufficient to reduce dispersion viscosity to a predetermined desirable level depends on a number of factors including the nature of the polymer, the amount of residual fluorosurfactant if present, the solids content of the dispersion and the amount and type of non-ionic surfactant present. Determining an optimum level of cationic surfactant for commercial production can easily be ascertained empirically by one skilled in the art using samples of the dispersion. In some cases, a small amount of a cationic surfactant may initially increase the viscosity of the dispersion before enough is added to reduce the viscosity. Typically, the viscosity is reduced significantly by the addition of amounts of the cationic surfactant in slight excess over the small amount which produces a viscosity increase but larger amounts do not provide further significant decrease in viscosity. In a preferred embodiment of this invention, the cationic surfactant is added in an amount of at least about 100 ppm, preferably about 100 ppm to about 1000 ppm based on the weight of the dispersion. Preferably, the amount of cationic surfactant added reduces the viscosity of the concentrated dispersion to less than about 50 cP, more preferably less than about 40 cP, and most preferably less than about 30 cP.

Anion Exchange Resins

The anion exchange resins for use in accordance with the preferred embodiment of the present invention can be either strongly basic or weakly basic. Suitable weakly basic anion exchange resins contain primary, secondary amine, or tertiary amine groups. Suitable strongly basic anion exchange resin contain quaternary ammonium groups. Although weakly basic resins are useful because they can be regenerated more easily, strongly basis resins are preferred when it is desired to reduce fluorosurfactant to very low levels and for high utilization of the resin. Strongly basic ion exchange resins also have the advantage of less sensitivity to the pH of the media. Strongly basic cation exchange resins have an associated counter ion and are typically available in chloride or hydroxyl ion form but are readily converted to other forms if desired. Anion exchange resins with hydroxyl, chloride, sulfate, and nitrate can be used for the removal of the fluorosurfactant but anion exchange resins in the form of a hydroxyl counter ion are preferred to prevent the introduction of additional anions and to increase pH during anion exchange because a high pH, i.e., greater than 9, is desirable in the product prior to shipping to inhibit bacterial growth. Examples of suitable commercially-available strong base anion exchange resins with quaternary ammonium groups with a trimethylamine moiety include DOWEX® 550A, US Filter A464-OH, SYBRON M-500-OH, SYBRON ASB1-OH, PUROLITE A-500-OH, Itochu TSA 1200, AMBERLITE® IR 402. Examples of suitable commercially-available strong base anion exchange resins with quaternary ammonium groups with a dimethyl ethanol amine moiety include US Filter A244-OH, AMBERLITE® 410, DOWEX® MARATHON A2, and DOWEX® UPCORE Mono A2.

Anion exchange resin preferably used in the process of the present invention is monodisperse. More preferably, the anion exchange resin beads have a number average size distribution in which 95% of the beads have a diameter within plus or minus 100 μm of the number average bead diameter.

The monodisperse anion exchange resin has a particle size which provides a suitable pressure drop through the bed. Very large beads are fragile and prone to breakage. Very small ion exchange beads are susceptible to tight particle packing resulting in tortuous channels in the bed. This can result in high shear conditions in the bed. Preferred ion exchange resin has a number average bead size about 450 to about 800 μm, more preferably, the ion exchange resin beads have a number average bead diameter of about 550 to about 700 μm.

Process

The present invention permits reducing the fluorosurfactant content of a fluorosurfactant-containing dispersion to a predetermined level, preferably a level no greater than about 300 ppm, more preferably a predetermined level no greater than about 100 ppm, especially a predetermined level no greater than about 50 ppm.

The fluorosurfactant content can be reduced by any of the procedures as have been described by the prior art. One method for removal of fluorosurfactants from fluoropolymer dispersions is disclosed in U.S. Pat. No. 4,369,266 and includes the addition of a stabilizing surfactant followed by concentration by ultrafiltration. In the preferred embodiment of the present invention, the fluorosurfactant is removed by adsorption onto an ion exchange resin as taught has been taught in U.S. Pat. No. 3,882,153 (Seki et al) and U.S. Pat. No. 4,282,162 (Kuhls).

Contacting of the anion exchange resin with the dispersion can occur before or after concentration but typically the lower solids material before concentration is easier to process, especially when a fixed bed is employed for carrying out the contacting step. If the process is carried out prior to concentration, nonionic surfactants are added prior to contact with the anion exchange resin as discussed above.

Any of a variety of techniques which bring the dispersion in contact with the anion exchange resin can be used to carrying out ion exchange of the process. For example, the process can be carried out by addition of ion exchange resin bead to the dispersion in a stirred tank followed by separation of dispersion from the anion exchange resin beads by filtration. Another suitable method is to pass the dispersion through a fixed bed of anion exchange resin instead of using a stirred tank. Flow can be upward or downward through the bed and no separate separation step is needed since the resin remains in the fixed bed.

The contacting of the dispersion is performed at a temperature which is sufficiently high to facilitate the rate of ion exchange and to reduce the viscosity of the dispersion but being below a temperature at which the anion exchange resin degrades at a detrimentally high rate. The process should be run at a temperature below the cloud point of the non-ionic surfactant to prevent phase separation during the ion exchange process. Upper treatment temperature will vary with the type of polymer employed. Typically, temperatures will be between 20° C. and 80° C. Preferably, the temperature is between about 45° C. and 65° C., more preferably between about 50° C. and 60° C.

The fluorosurfactant can be recovered from the anion exchange resin if desired or the resin with the fluorosurfactant can be disposed of in an environmentally acceptable method, e.g., by incineration. If it is desired to recover the fluorosurfactant, the fluorosurfactant may be removed from resin by elution. Elution of fluorosurfactant adsorbed on the anion exchange resin is readily achieved when weak base resins are used by use of ammonia solution as demonstrated by Seki in U.S. Pat. No. 3,882,153, by a mixture of dilute mineral acid with organic solvent (e.g., HCl/ethanol) as demonstrated by Kuhls in U.S. Pat. No. 4,282,162, or by strong mineral acids such as sulfuric acid and nitric, transferring the adsorbed fluorinated carboxylic acid to the eluent. The fluorosurfactant in the eluent in high concentration can easily be recovered in the form of a pure acid or in the form of salts by common methods such as acid-deposition, salting out, or other forms of concentration, etc.

The cationic surfactant can be added to the stabilized dispersion at various times as the process is carried out. Preferably, the cationic surfactant is added after removal of the fluorosurfactant because the cationic surfactant may form a complex with the fluorosurfactant, hampering its removal. The cationic surfactant can be added after concentration if desired. However, the significant increase in viscosity which is observed in some reduced fluorosurfactant dispersions upon concentration can be avoided if the cationic surfactant is added prior to concentration.

What is claimed is:

1. A process for reducing fluorosurfactant content of a stabilized fluorosurfactant-containing aqueous fluoropolymer dispersion comprising:
   reducing the fluorosurfactant content of said stabilized fluorosurfactant-containing aqueous fluoropolymer dispersion;
   concentrating said dispersion after reducing the fluorosurfactant content of said stabilized fluorosurfactant-containing aqueous fluoropolymer dispersion;
   adding cationic surfactant to said dispersion after reducing the fluorosurfactant and prior to said concentrating; and
   wherein said stabilized fluorosurfactant-containing aqueous fluoropolymer dispersion comprises nonionic surfactant.

2. The process of claim 1 wherein said reducing of the fluorosurfactant content of said stabilized fluorosurfactant-containing aqueous fluoropolymer dispersion is carried out by contacting said stabilized fluorosurfactant-containing aqueous fluoropolymer dispersion with an anion exchange resin to reduce fluorosurfactant content and separating said anion exchange resin from said dispersion after the fluorosurfactant content has been reduced.

3. The process of claim 1 wherein said stabilized fluorosurfactant-containing aqueous fluoropolymer dispersion has a solids content of about 15 to about 70 wt %.

4. The process of claim 1 wherein said cationic surfactant is added in an amount of at least 100 ppm based the weight of the dispersion.

5. The process of claim 1 wherein said cationic surfactant is added in an amount of about 100 ppm to about 1000 ppm based the weight of the dispersion.

6. The process of claim 1 wherein said non-ionic surfactant is present in an amount of about 1 to about 5% based the weight of the dispersion.

7. The process of claim 1 wherein said stabilized dispersion has a solids content of at least 25 wt %.

8. The process of claim 1 wherein said stabilized dispersion has a solids content of at least 30 wt %.

9. The process of claim 1 wherein said stabilized dispersion has a solids content of at least 35 wt %.

10. The process of claim 2 wherein said anion exchange resin has functional groups selected from the group comprising primary amine, secondary amine, tertiary amine, and quaternary ammonium groups.

11. The process of claim 2 wherein said anion exchange resin comprises quaternary ammonium groups.

12. The process of claim 2 wherein said anion exchange resin is in hydroxide form.

13. The process of claim 2 wherein said contacting said stabilized fluorosurfactant-containing aqueous fluoropolymer dispersion with anion exchange resin reduces fluorosurfactant content to a level of less than 300 ppm.

14. The process of claim 2 wherein said contacting said stabilized fluorosurfactant-containing aqueous fluoropolymer dispersion with anion exchange resin reduces fluorosurfactant content to a level of less than 100 ppm.

15. The process of claim 2 wherein said contacting said stabilized fluorosurfactant-containing aqueous fluoropolymer dispersion with anion exchange resin reduces fluorosurfactant content to a level of less than 50 ppm.

16. The process of claim 1 wherein said cationic surfactant is added in an amount sufficient to reduce dispersion viscosity.

* * * * *